(12) United States Patent
Hakiri et al.

(10) Patent No.: US 8,613,511 B2
(45) Date of Patent: Dec. 24, 2013

(54) PIGMENT DISPERSION LIQUID, INKJET INK, INK CARTRIDGE, IMAGE FORMING APPARATUS, RECORDING METHOD, AND IMAGE FORMED MATTER

(75) Inventors: Minoru Hakiri, Shizuoka (JP); Mitsuru Naruse, Shizuoka (JP); Hiroyuki Fushimi, Shizuoka (JP); Shinn Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 13/259,996

(22) PCT Filed: Apr. 8, 2010

(86) PCT No.: PCT/JP2010/056726
§ 371 (c)(1),
(2), (4) Date: Sep. 23, 2011

(87) PCT Pub. No.: WO2010/117087
PCT Pub. Date: Oct. 14, 2010

(65) Prior Publication Data
US 2012/0026237 A1 Feb. 2, 2012

(30) Foreign Application Priority Data
Apr. 8, 2009 (JP) ................................. 2009-094112

(51) Int. Cl.
*G01D 11/00* (2006.01)
(52) U.S. Cl.
USPC ....................................................... 347/100
(58) Field of Classification Search
None
See application file for complete search history.

(56) References Cited

U.S. PATENT DOCUMENTS

| | | | |
|---|---|---|---|
| 5,085,698 A | 2/1992 | Ma et al. | |
| 5,172,133 A | 12/1992 | Suga et al. | |
| 5,221,334 A | 6/1993 | Ma et al. | |
| 5,571,311 A | 11/1996 | Belmont et al. | |
| 5,980,623 A | 11/1999 | Hiraoka et al. | |
| 6,245,832 B1 | 6/2001 | Suzuki et al. | |
| 6,786,959 B2 | 9/2004 | Hakiri et al. | |
| 7,101,919 B2 | 9/2006 | Hasegawa et al. | |
| 7,578,876 B2 * | 8/2009 | Nakajima et al. | 106/31.65 |
| 7,798,629 B2 | 9/2010 | Hakiri et al. | |
| 7,815,301 B2 | 10/2010 | Hasegawa et al. | |
| 2003/0019392 A1 * | 1/2003 | Wakabayashi et al. | 106/31.27 |
| 2005/0117008 A1 | 6/2005 | Konishi | |

(Continued)

FOREIGN PATENT DOCUMENTS

| CN | 1659245 A | 8/2005 |
|---|---|---|
| CN | 1662385 A | 8/2005 |

(Continued)

OTHER PUBLICATIONS

International Search Report Issued Jul. 20, 2010 in PCT/JP10/056726 Filed Apr. 8, 2010.

(Continued)

*Primary Examiner* — Geoffrey Mruk
(74) *Attorney, Agent, or Firm* — Oblon, Spivak, McClelland, Maier & Neustadt, L.L.P.

(57) ABSTRACT

The present invention provides an inkjet pigment dispersion liquid including a carbon black, a dispersant, and water, wherein the total number of coarse particles having a particle diameter of 0.5 μm or greater contained in the inkjet pigment dispersion liquid is 1,000,000/5 μL or less, and provides an inkjet ink using the inkjet pigment dispersion liquid.

6 Claims, 3 Drawing Sheets

(56) References Cited

U.S. PATENT DOCUMENTS

| | | |
|---|---|---|
| 2006/0272543 A1 | 12/2006 | Hakiri et al. |
| 2007/0120928 A1* | 5/2007 | Ma et al. ................. 347/100 |
| 2007/0256593 A1 | 11/2007 | Koike et al. |
| 2008/0036830 A1 | 2/2008 | Natori et al. |
| 2008/0124481 A1 | 5/2008 | Nakajima et al. |
| 2010/0020142 A1 | 1/2010 | Bannai et al. |
| 2010/0277548 A1 | 11/2010 | Hakiri et al. |
| 2010/0302306 A1 | 12/2010 | Hasegawa et al. |

FOREIGN PATENT DOCUMENTS

| | | |
|---|---|---|
| CN | 101121836 A | 2/2008 |
| CN | 101389720 A | 3/2009 |
| JP | 56 147871 | 11/1981 |
| JP | 05 239392 | 9/1993 |
| JP | 08 003498 | 1/1996 |
| JP | 08 081646 | 3/1996 |
| JP | 08 283633 | 10/1996 |
| JP | 08 333531 | 12/1996 |
| JP | 09 194775 | 7/1997 |
| JP | 10 298463 | 11/1998 |
| JP | 11 228891 | 8/1999 |
| JP | 2000 063727 | 2/2000 |
| JP | 2000 144028 | 5/2000 |
| JP | 2001 081366 | 3/2001 |
| JP | 2001 106949 | 4/2001 |
| JP | 2002 003767 | 1/2002 |
| JP | 2003 238853 | 8/2003 |
| JP | 2004 026947 | 1/2004 |
| JP | 2004 027026 | 1/2004 |
| JP | 2004 059913 | 2/2004 |
| JP | 2004 299386 | 10/2004 |
| JP | 3625595 | 12/2004 |
| JP | 2005 074938 | 3/2005 |
| JP | 2005 097517 | 4/2005 |
| JP | 2005 161859 | 6/2005 |
| JP | 2005 254611 | 9/2005 |
| JP | 2005 281691 | 10/2005 |
| JP | 2005 314528 | 11/2005 |
| JP | 2006 008858 | 1/2006 |
| JP | 2006 077232 | 3/2006 |
| JP | 2006 082378 | 3/2006 |
| JP | 2006 188626 | 7/2006 |
| JP | 2006 219584 | 8/2006 |
| JP | 2007 146167 | 6/2007 |
| JP | 2007 217472 | 8/2007 |
| JP | 2007 253357 | 10/2007 |
| JP | 2007 277361 | 10/2007 |
| JP | 2008 045023 | 2/2008 |
| JP | EP 1 887 058 A1 * | 2/2008 ............. C09D 11/00 |
| JP | 2008 063546 | 3/2008 |
| JP | 2008 063573 | 3/2008 |
| JP | 2008 179804 | 8/2008 |
| JP | 2008 222980 | 9/2008 |
| JP | 2008 231182 | 10/2008 |

OTHER PUBLICATIONS

Extended European Search Report issued Sep. 25, 2012, in Application No. / Patent No. 10761785.4—1217 / 2417206 PCT/JP2010056726.

Combined Chinese Office Action and Search Report Issued May 23, 2013 in Patent Application No. 201080015038.6 (with English translation).

* cited by examiner

PIGMENT DISPERSION LIQUID, INKJET INK, INK CARTRIDGE, IMAGE FORMING APPARATUS, RECORDING METHOD, AND IMAGE FORMED MATTER

TECHNICAL FIELD

The present invention relates to a pigment dispersion liquid, an inkjet ink, an ink cartridge, an image forming apparatus, a recording method, and image formed matter.

BACKGROUND ART

Inkjet recording systems enable simple process as compared to other recording systems, and thus have such advantages that full-color images can be easily printed, and even with use of an apparatus having a simple structure, high-resolution images can be obtained.

As inkjet inks, dye-based inks are used in which various types of water-soluble dyes are dissolved in a mixture liquid containing water or water and an organic solvent. Such dye-based inks have a drawback of being poor in light resistance, although they are excellent in color tone sharpness.

In the meanwhile, pigment-based inks in which carbon black and various types of organic pigments are dispersed are more excellent in light resistance than dye-based inks, and thus studies on pigment-based inks are being intensively made.

However, pigment-based inks tend to cause nozzle clogging as compared to dye-based inks.

Pigment inks are usually prepared as follows. A coloring material and a dispersant are preliminarily dispersed in an aqueous solvent to prepare a dispersion, and then, the dispersion is dispersed to a predetermined degree by a medium dispersion device, followed by diluting at a predetermined concentration.

Pigment-water-based aqueous inks usually contain a surfactant and an aqueous resin to disperse a hydrophobic pigment therein, but the reliability of images obtained is extremely low. Then, in view to improving the quality of images, a film-formable resin particle is added into an ink liquid, however, it is difficult to disperse a plurality of components in a state of being finely and stably dispersed for a long period of time. When a dispersant such as a surfactant is used in a large amount in order to stably disperse such a fine particle, a problem inconveniently occurs, for example, air bubbles occur inside an ink tank and or an inkjet head, causing a degradation in the image quality. Studies are made to introduce a hydrophilic group into a surface of a pigment or to use a resin containing a hydrophilic group, but when a plurality of these resins are mixed, the dispersed state is unstable to cause a degradation of storage stability, although these resins are stable in single use thereof.

Many techniques have been proposed to solve the above-mentioned problems.

There are the following techniques, for example, an inkjet recording image excellent in visibility is obtained by using a recording medium which contains a specific fine particle and is provided with an ink receiving part in which the gloss values of white parts and printed parts are specified (e.g., see PTL 1); an ink recorded matter having an image excellent in glossiness, smoothness and texture is obtained by inkjet recording on a recording medium having a surface roughness (Ra) value A using each color ink having a surface roughness (Ra) value B (for example, see PTL 2), a recorded matter having a high image density and less reduction in glossiness is obtained with maintaining excellent dispersion stability but without causing nozzle clogging by printing using an ink, which contains a resin emulsion in an aqueous medium, on a recording paper having an ink receiving layer containing a silica fine particle and/or an alumina fine particle and having a specified glossiness (for example, see PTLs 3 and 4); an ink recorded matter excellent in glossiness is obtained by printing an aqueous color ink on a recording medium whose surface is treated with a coating liquid containing an alumina particle and the like (for example, see PTL 5); and an image quality close to a photograph, in which a reduction in glossiness at an image part can be prevented, is obtained by print-recording on a recording medium having a porous layer as an uppermost surface layer using an ink containing a polymer fine particle containing a water-insoluble or sparsely water soluble coloring material (for example, see PTL 6), and the like.

Besides the above, the following techniques are also reported: a recorded matter having an improved glossiness is obtained by using an inkjet recording ink containing an aqueous dispersion liquid of a microcapsulated pigment in which a pigment particle is covered with a polymer (for example, see PTL 7); an image having a uniform solid-part image density and excellent quality is obtained by printing an aqueous ink having a surface tension of 25 mN/m to 45 mN/m on a recording medium having a specific contact angle (for example, see PTL 8); for the purpose of obtaining a high image density, a water-insoluble coloring material and a chargeable pseudo-resin fine particle which is smaller than the coloring material are incorporated into an ink (for example, see PTL 9); a self-dispersible pigment having a specific oil absorption (DBP) is incorporated into an ink (for example, see PTL 10); and an aqueous carbon black dispersion liquid is used which is composed of a surface-modified carbon black, has a HLB value of from 7 to 18 and contains a nonionic surfactant having an acetylene skeleton (for example, see PTL 11), and the like.

Further, for the purpose of obtaining a high image density and high image quality, there have been reported inventions such as an inkjet ink in which the amount of a surfactant having a HLB equal to or more than 3 and less than 10 is specified (for example, see PTL 12); an ink set composed of a recording liquid containing a coloring material and of a treatment liquid having a specific isoelectric point (for example, see PTL 13), and the like.

Further, in order to stabilize the dispersibility of ink, the following methods have been reported: a method of dispersing a water-dispersible resin having a carboxyl group and a nonionic hydrophilic group in water (for example, see PTL 14); a method of making the polarity of a water-soluble polymer the same as that of a surfactant used or adding a nonionic surfactant to the water-soluble polymer (for example, see PTL 15); a method of making the polarity of a colored ionic polyester resin the same as that of a hydrophilic group of a colorant in an aqueous recording liquid (for example, see PTL 16); a method of making the dispersion polarity of a pigment the same as that of a resin fine particle (for example, see PTL 17), and the like.

Similarly to the above, for the purpose of stabilizing the dispersibility of ink, there have also been proposed an aqueous inkjet ink composition in which an aldehyde naphthalene sulfonate dispersant, a pigment dispersion liquid having such a particle size distribution that at least 70% of pigment particles having a diameter smaller than 0.1 μm and other pigment particles having a diameter equal to or smaller than 0.1 μm, and/or at least one sulfone solvent are contained (for example, see PTL 18); a recording liquid composed of an aqueous medium containing a pigment, a polymer dispersant and a nonionic surfactant (for example, see PTL 19); and using an AB or BAB block copolymer as a dispersant for pigment (for example, see PTLs 20 and 21). Furthermore, it has been proposed to use a specific pigment, a water-soluble resin and a solvent (for example, see PTL 22).

In the meanwhile, as a method of dispersing a pigment, there have been proposed a method of introducing a substituent containing a water-soluble group into a carbon black (for example, see PTL 23); a method in which a water-soluble monomer or the like is polymerized onto the surface of a carbon black (for example, see PTL 24); and a method of subjecting a carbon black to an oxidization treatment (for example, see PTL 25) as well.

Also, a method of ensuring the water resistance and ejection stability by using an ink containing a ternary polymer composed of an oxidized carbon black, an acrylic acid, styrene, and α-methylstyrene is disclosed in PTL 26.

In addition, an inkjet recording liquid is disclosed in PTL 27, which is characterized in that the volume average particle diameter of dispersed particles therein is 30 nm to 200 nm.

However, with respect to the above-mentioned conventional ink liquids, black pigment inks are not sufficient in high image density and do not satisfy the demands, although color pigment inks can meet the demands for high image density.

PTLs 28 to 30 each disclose an example of ink liquid using a bead having a bead diameter of from about 0.05 mm to about 1.0 mm for use in bead mill dispersion treatment, and PTL 31 proposed an ink liquid using an anionic surfactant as a dispersant, and discussed that the molecular weight of the anionic surfactant is preferably in the range of $1,000 \leq m \leq 30,000$. However, both the proposed ink liquids are insufficient in terms of dispersion stability, and pigment components weak to strong impact during dispersion are poor in stability after being dispersed, and these ink liquids still have drawbacks with regard to ejection stability and the like.

Meanwhile, in order to provide an ink having improved ejection stability, there have been proposed a method in which the water evaporation rate, the viscosity increasing rate and the particle diameter are defined so as to improve the ejection stability of the ink (for example, see PTL 32); an inkjet liquid composition free from clogging at the nozzle tip, in which values of the conductivity, the viscosity and the surface tension of a water-soluble solvent are defined (for example, see PTL 33); and an ink liquid in which a colored fine particle having a quaternalized carboxyl group on its surface and a diameter of 0.5 μm or smaller is contained (for example, see PTL 34).

In the above mentioned Patent Literatures, an inkjet ink, which has a good balance in glossiness between an image part having a high image density and capable of imparting excellent visibility as well as good texture and a non-image part and which is excellent in high image density as well as ejection stability, and a recording medium having the above features have not yet been provided, and further improvements are required therefor. Note that inventions of inkjet inks (PTLs 35 to 37) made by the present inventors have been also known.

CITATION LIST

Patent Literature

[PTL 1] Japanese Patent Application Laid-Open (JP-A) No. 2005-254611
[PTL 2] Japanese Patent Application Laid-Open (JP-A) No. 2005-161859
[PTL 3] Japanese Patent Application Laid-Open (JP-A) No. 2004-026947
[PTL 4] Japanese Patent Application Laid-Open (JP-A) No. 2004-027026
[PTL 5] Japanese Patent Application Laid-Open (JP-A) No. 2007-253357
[PTL 6] Japanese Patent Application Laid-Open (JP-A) No. 2006-082378
[PTL 7] Japanese Patent Application Laid-Open (JP-A) No. 2005-097517
[PTL 8] Japanese Patent Application Laid-Open (JP-A) No. 2005-074938
[PTL 9] Japanese Patent Application Laid-Open (JP-A) No. 2006-008858
[PTL 10] Japanese Patent Application Laid-Open (JP-A) No. 2002-003767
[PTL 11] Japanese Patent Application Laid-Open (JP-A) No. 2006-219584
[PTL 12] Japanese Patent Application Laid-Open (JP-A) No. 2001-106949
[PTL 13] Japanese Patent Application Laid-Open (JP-A) No. 2004-299386
[PTL 14] Japanese Patent Application Laid-Open (JP-A) No. 05-239392
[PTL 15] Japanese Patent Application Laid-Open (JP-A) No. 08-283633
[PTL 16] Japanese Patent Application Laid-Open (JP-A) No. 2000-63727
[PTL 17] Japanese Patent Application Laid-Open (JP-A) No. 2001-81366
[PTL 18] Japanese Patent Application Laid-Open (JP-A) No. 08-333531
[PTL 19] Japanese Patent Application Laid-Open (JP-A) No. 56-147871
[PTL 20] U.S. Pat. No. 5,085,698
[PTL 21] U.S. Pat. No. 5,221,334
[PTL 22] U.S. Pat. No. 5,172,133
[PTL 23] U.S. Pat. No. 5,571,311
[PTL 24] Japanese Patent Application Laid-Open (JP-A) No. 08-81646
[PTL 25] Japanese Patent Application Laid-Open (JP-A) No. 08-3498
[PTL 26] Japanese Patent Application Laid-Open (JP-A) No. 09-194775
[PTL 27] Japanese Patent Application Laid-Open (JP-A) No. 2000-144028
[PTL 28] Japanese Patent Application Laid-Open (JP-A) No. 2005-281691
[PTL 29] Japanese Patent Application Laid-Open (JP-A) No. 2005-314528
[PTL 30] Japanese Patent Application Laid-Open (JP-A) No. 2006-188626
[PTL 31] Japanese Patent (JP-B) No. 3625595
[PTL 32] Japanese Patent Application Laid-Open (JP-A) No. 2006-077232
[PTL 33] Japanese Patent Application Laid-Open (JP-A) No. 2007-217472
[PTL 34] Japanese Patent Application Laid-Open (JP-A) No. 2007-146167
[PTL 35] Japanese Patent Application Laid-Open (JP-A) No. 2008-063546
[PTL 36] Japanese Patent Application Laid-Open (JP-A) No. 2008-045023
[PTL 37] Japanese Patent Application Laid-Open (JP-A) No. 2008-231182

SUMMARY OF INVENTION

Technical Problem

The present invention has been made in light of the above-mentioned situation and aims to provide a pigment dispersion liquid excellent in storage stability; an inkjet ink containing the pigment dispersion, which has a good balance in glossiness between an image part having a high image density and capable of imparting excellent visibility as well as good texture and a non-image part, and which is excellent in ejection stability and storage stability thereof, without causing clogging of inkjet heads; an ink cartridge; an image forming apparatus; a recording method; and an image formed matter.

As a result of carrying out extensive studies and examinations in an attempt to solve the aforesaid problems, the present inventors found that in an inkjet recording method of providing an ink to a surface of a recording medium according to recording information to thereby performing recording, when an image is recorded on a recording medium having a glossiness of less than 80% at a light-incident angle of 75 degrees using an ink which contains a pigment dispersion liquid containing a carbon black, a dispersant, and water, the total number of coarse particles having a particle diameter of 0.5 μm or greater contained in the inkjet pigment dispersion liquid is 1,000,000/5 μL or less, the glossiness of the image recorded on the recording medium is 90% of the glossiness of a non-image part thereof, and the use of such an ink and such a recording medium makes it possible to obtain an image having a good balance in glossiness between an image part and a non-image part of the recording medium, which leads to the present invention.

Solution to Problem

More specifically, the present invention provides the followings (1) to (15):

(1) An inkjet pigment dispersion liquid including:
a carbon black,
a dispersant, and
water,
wherein the total number of coarse particles having a particle diameter of 0.5 μm or greater contained in the inkjet pigment dispersion liquid is 1,000,000/5 μl or less.

(2) The inkjet pigment dispersion liquid according to (1), wherein the carbon black is a gas black, the BET specific surface area of the carbon black is 100 m$^2$/g to 400 m$^2$/g, and primary particles of the carbon black have an average particle diameter (D50) of 20 nm to 180 nm.

(3) The inkjet pigment dispersion liquid according to (2), wherein the standard deviation of the particle diameter of the carbon black is one-half or less the average particle diameter (D50).

(4) The inkjet pigment dispersion liquid according to any one of (1) to (3), wherein the dispersant is a sodium naphthalenesulfonate-formalin condensate.

(5) The inkjet pigment dispersion liquid according to (4), wherein the sodium naphthalenesulfonate-formalin condensate contains a dimer, a trimer and a tetramer of a naphthalenesulfonic acid, and the total amount of the dimer, trimer and tetramer of the naphthalenesulfonic acid contained in the total amount of the sodium naphthalenesulfonate-formalin condensate is 20 wt % to 80 wt %.

(6) The inkjet pigment dispersion liquid according to any one of (1) to (5), wherein the dispersant is contained in the inkjet pigment dispersion liquid at a ratio of dispersant to carbon black, on a weight basis, of 0.01:1 to 2:1.

(7) An inkjet ink including:
the inkjet pigment dispersion liquid according to any one of (1) to (6),
a wetting agent,
a surfactant,
a penetrant, and
a resin component,
wherein the inkjet ink contains the carbon black in an amount of 1 wt % to 20 wt %, the wetting agent in an amount of 10 wt % to 50 wt %, the surfactant in an amount of 0.01 wt % to 5 wt %, the penetrant in an amount of 0.05 wt % to 5 wt % and the resin component in an amount of 0.01 wt % to 7 wt %.

(8) The inkjet ink according to (7), wherein the wetting agent contains a polyhydric alcohol having an equilibrium moisture content of 25 wt % or more measured under conditions of 20° C. and 60% relative humidity, and trimethylglycine.

(9) The inkjet ink according to (8), wherein the trimethylglycine content is more than 10 wt % and equal to or less than 40 wt % to the total amount of the inkjet ink.

(10) The inkjet ink according to any one of (7) to (9), wherein the surfactant contains a compound represented by Structural Formula (1) described below:

Structural Formula (1)

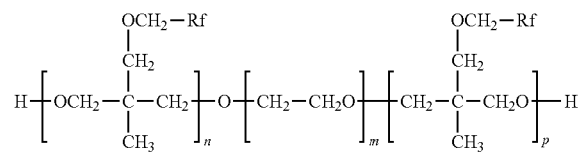

where Rf denotes a fluorine-containing group; m, n, and p each represent an integer, provided that n and p are not zero at the same time.

(11) An ink cartridge,
wherein the inkjet ink according to any one of (7) to (10) is housed.

(12) An image forming apparatus,
wherein one of the inkjet ink according to any one of (7) to (10) and the ink cartridge according to (11) is installed.

(13) A recording method including:
providing an ink to a surface of a recording medium according to recording information using the image forming apparatus according to (12) to thereby perform recording,
wherein the recording medium has a white paper glossiness of less than 80% at a light-incident angle of 75 degrees measured by JIS Z8741, and when recorded, the glossiness of an image part of the recording medium is 90% of the glossiness of a non-image part thereof.

(14) The recording method according to (13), wherein the recording medium includes a raw paper mainly composed of a wood pulp, and an ink receiving layer containing kaolin and a binder on one surface or on both surfaces of the raw paper, and the recording medium has a white paper glossiness of less than 80% at a light-incident angle of 75 degrees measured by JIS Z8741.

(15) image formed matter including:
an image formed by the recording method according to one of (13) and (14).

Advantageous Effects of Invention

With a combination of an inkjet ink using the pigment dispersion liquid of the present invention and the recording medium of the present invention, it is possible to provide an inkjet recording ink and a recording method which are capable producing an image having a high image density and excellent in visibility at an image part thereof because of the good balance in glossiness between the image part and a non-image part, and the inkjet recording ink is also excellent in ink ejection stability as well as ink storage stability.

DESCRIPTION OF EMBODIMENTS

Hereinafter, the present invention will be described in detail.
<Pigment Dispersion Liquid>

A pigment dispersion liquid of the present invention contains a carbon black as pigment particles, a dispersant and water, and may further contain other components. In the pigment dispersion liquid, the total number of coarse particles having a particle diameter of 0.5 μm or greater contained in the inkjet pigment dispersion liquid is 1,000,000/5 μL (i.e., 200,000/μL) or less.
(Carbon Black (Black Pigment))

As for the carbon black as a black pigment for use in the inkjet pigment dispersion liquid of the present invention, a gas black is preferably used which has a BET specific surface area of 100 m$^2$/g to 400 m$^2$/g, and contains primary particles having an average particle diameter (an average primary particle diameter) of 10 nm to 30 nm.

The average primary particle diameter can be determined by taking an image of particles by an electron micrograph and calculating the diameter and the number of particles in the image, and the BET specific surface area can be measured by the BET method through nitrogen adsorption.

The carbon black as pigment particles used in the pigment dispersion liquid in the inkjet ink preferably has an average particle diameter D50 of primary particles thereof (50% accumulated value of a number dependant particle size distribution) of 20 nm to 180 nm, and more preferably of 50 nm to 130 nm. When the average particle diameter D50 is greater than 180 nm, unfavorably, the ejection stability degrades. In contrast, when the D50 is smaller than 20 nm, unfavorably, the image density lowers. In addition, the dispersion stability of the pigment degrades, which has an adverse impact on the ejection stability of the ink after being stored.

The standard deviation of the particle diameter of the carbon black used as pigment particles is preferably one-half or less the D50. When the standard deviation is more than one-half the D50, the ejection stability of the ink degrades, and unfavorably, image thin spots are liable to occur.

When the D50 is more than 5 μm or the D90 (90% accumulated value of a number particle size distribution) is more than 10 μm at the time of the solvent residual rate being 60% in dry conditions, preferably, the image density increases.

It is more preferred that the D50 be more than 10 μm and the D90 be more than 20 μm.

Figure 2A:
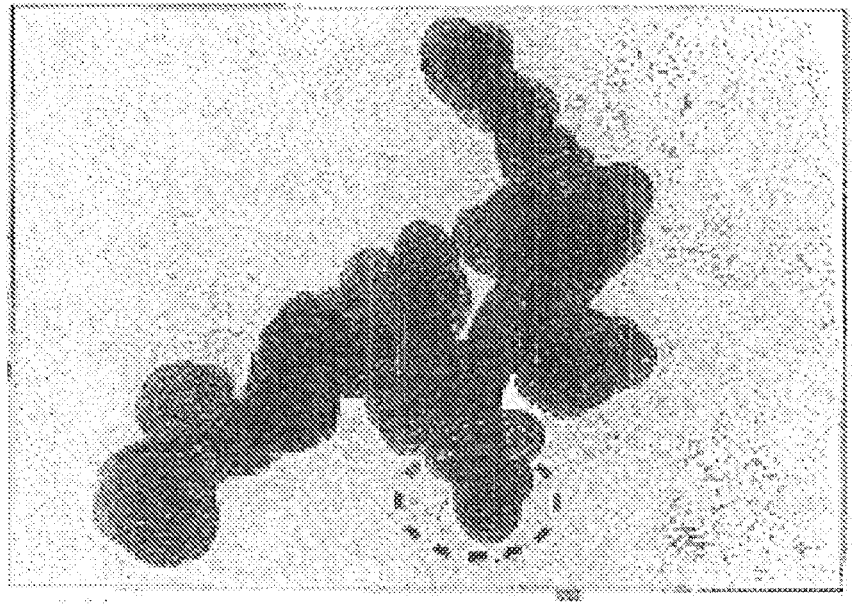
FIG. 2A is an electron photomicrograph of a structure of a carbon black.
Figure 2B:
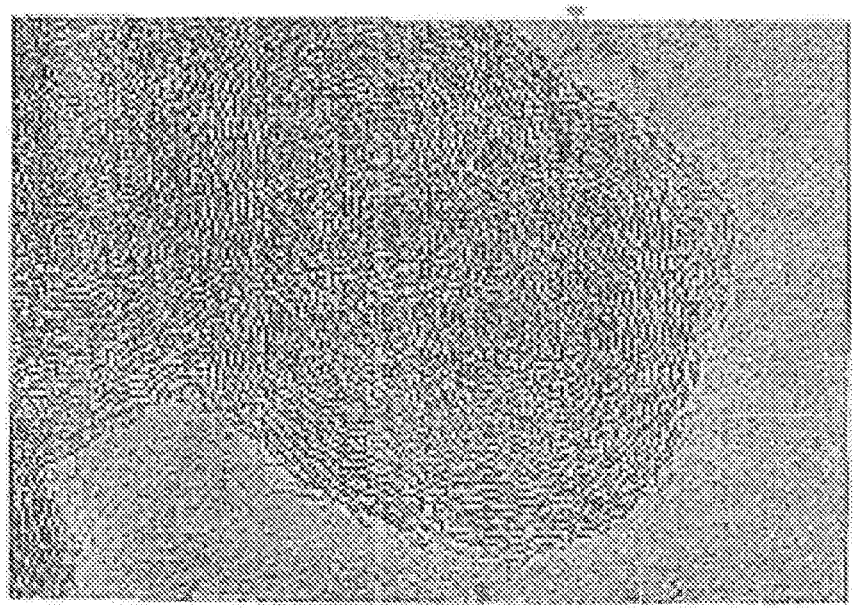
FIG. 2B is another electron photomicrograph of a structure of a carbon black.
Figure 2C:
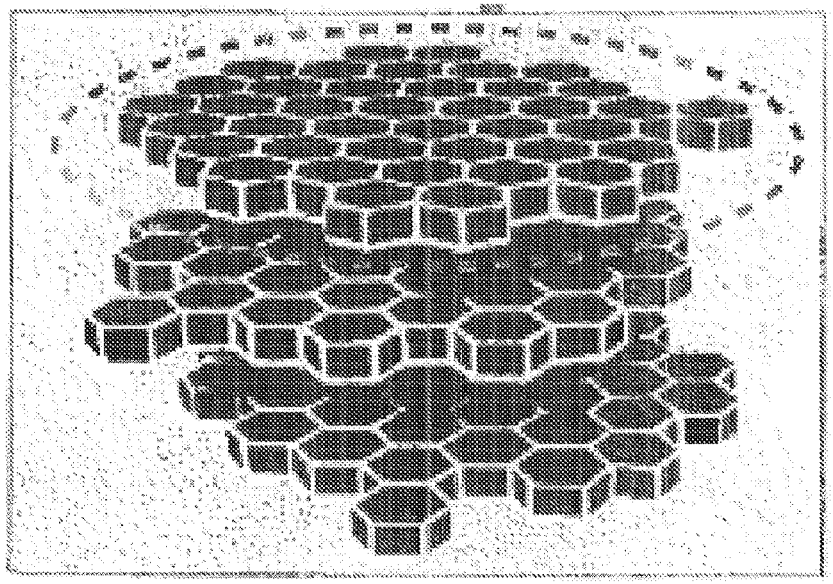
FIG. 2C is a schematic diagram illustrating a structure of a carbon black.
Figure 2D:
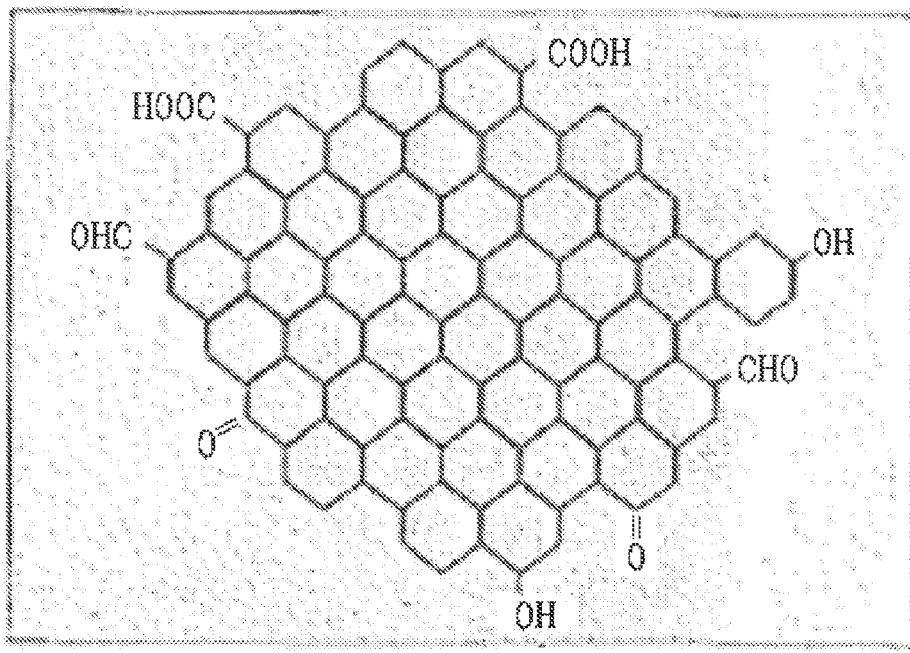
FIG. 2D is another schematic diagram illustrating a structure of a carbon black.

The average primary particle diameter (10 nm to 30 nm) of gas black is a primary particle diameter of the carbon black and is an arithmetic average diameter obtained from the electron photomicrograph illustrated in FIG. 2B.

In addition, the average primary particle diameter (20 nm to 180 nm) of carbon black is an average particle diameter of the carbon black obtained by dynamic light scattering for particle size measurement of the ink.

Generally, unlike typical organic pigments, carbon black takes a structure as illustrated in FIG. 2A, and an ink has a number of aggregated structures (aggregates). Here, the average particle size of the aggregated structures or aggregates is measured, and the measured particle size is regarded as the primary particle size of the carbon black.
(Dispersant)

As the dispersant for use in the pigment dispersion liquid of the present invention, a sodium naphthalenesulfonate-formalin condensate is used.

The sodium naphthalenesulfonate-formalin condensate is a condensate of sodium naphthalenesulfonate with formaldehyde, and is not particularly limited as long as it is a compound composed of a repeating unit of the condensate.

In the sodium naphthalenesulfonate-formalin condensate, the total amount of a dimer, a trimer and a tetramer of a naphthalenesulfonic acid contained in the entire amount of the sodium naphthalenesulfonate-formalin condensate is 20 wt % to 80 wt %, and more preferably of 35 wt % to 65 wt %.

When the above-mentioned total amount is less than 20 wt %, the dispersibility of the pigment dispersion liquid degrades, and the storage stability thereof and the ink degrades to cause nozzle clogging easily. In contrast, when the total amount is more than 80 wt %, the viscosity of the pigment dispersion liquid increases, and it may be difficult to disperse the carbon black.

The dispersant is contained in the pigment dispersion liquid for use in the present invention preferably at a ratio of dispersant to carbon black, on a weight basis, of 0.01:1 to 2:1, and more preferably at a ratio of 0.25:1 to 1:1. When the dispersant content ratio is less than 0.01, the effects of the present invention are difficult to attain, the storage stability of the pigment dispersion liquid and the ink degrades, causing nozzle clogging easily. When the dispersant content ratio is more than 2, printing using an inkjet system tends to be difficult due to the excessively high viscosity of the pigment dispersion liquid and the ink.

In the pigment dispersion liquid of the present invention, the amount of the dispersant contained therein is preferably in an amount of 0.1% by mass to 38% by mass, and more preferably in an amount of 1.0% by mass to 20% by mass relative to the total mass of the pigment dispersion liquid.

By employing such a dispersant, it is possible to make the carbon black in the dispersion liquid of the present invention have a volume average particle diameter (D50) of 70 nm to 180 nm and to set the standard deviation of the particle diameter in a particle size distribution of the carbon black to one-half or less the volume average particle diameter, thereby making it possible to provide a pigment dispersion liquid having a high image density and excellent in the ejection stability and the storage stability of the ink liquid.

The volume average primary particle diameter of the carbon black was measured using a particle size distribution meter (UPA, manufactured by NIKKISO Co., Ltd.) under conditions of 23° C. and 55% relative humidity. Note that the average primary particle diameter (D50) of the carbon black is a particle diameter based on volume distribution.

The carbon black concentration in the pigment dispersion liquid is preferably 5 wt % to 50 wt %, more preferably 10 wt % to 40 wt % relative to the total amount of the pigment dispersion liquid. When the carbon black concentration is less than 5 wt %, the productivity may decrease, and when it is more than 50 wt %, and it may be difficult to disperse the carbon black due to the excessively high viscosity of the pigment dispersion liquid.

(Water)

As water for use in the pigment dispersion liquid of the present invention, it is possible to use purified water or ultra-pure water such as ion exchanged water, ultrafiltrated water, reverse osmosis water, and distilled water.

In addition, it is preferred to use water sterilized by irradiation of ultraviolet ray or addition of hydrogen peroxide, because it is possible to prevent occurrence of fungi and bacteria when the resulting ink is stored over a long period of time.

(Other Components)

Into the pigment dispersion liquid of the present invention, various kinds of additives such as a water-soluble organic solvent, a nonionic surfactant, an anionic surfactant, a cationic surfactant, an amphoteric surfactant and an antiseptic agent can be added besides the above-mentioned carbon black, dispersant and water.

The water-soluble organic solvent is not particularly limited and may be suitably selected in accordance with the intended use. Specific examples thereof include alcohols such as methanol, ethanol, 1-propanol, and 2-propanol; polyhydric alcohols such as ethylene glycol, diethylene glycol, triethylene glycol, propylene glycol, and glycerin; pyrrolidone derivatives such as N-methylpyrrolidone, and 2-pyrrolidone; ketones such as acetone, and methylethylketone; and alkanol amines such as monoethanol amine, dimethanol amine, and triethanol amine.

The pigment dispersion liquid of the present invention can be obtained by dispersing the carbon black, the dispersant, water and various kinds of additives selected as required using a conventionally known dispersing device such as a sand mill, a ball mill, a roll mill, a bead mill, a nanomizer, and a homogenizer. At this stage, these components are preferably dispersed by bead-mill dispersion. For instance, by employing a bead-mill dispersion where a bead having a bead diameter, e.g., about several ten micrometers is used, the number of coarse particles can be adjusted to a desired value or lower and a sharp particle size distribution can be obtained, and thus it is possible to provide an inkjet ink having a high glossiness and a high image density.

In this dispersion treatment, it is preferred to use the dispersant at a ratio of dispersant to carbon black, on a weight basis, of 0.1:1 to 2:1, as described above, and to employ wet-type dispersion. The wet-type dispersion means a dispersion treatment in which a mixture of a carbon black, a dispersant, water, and a water-soluble solvent and other components selected as required is finely pulverized by a so-called "wet-type dispersion" so as to be dispersed. In preparation of the pigment dispersion liquid of the present invention, a filtration process through centrifugal separation or using a fine filter may be added.

The resulting pigment dispersion liquid of the present invention can be suitably used especially as a pigment-based inkjet ink.

<Inkjet Ink>

The inkjet ink of the present invention contains the above-mentioned pigment dispersion liquid of the present invention, a wetting agent, a surfactant, a penetrant and a resin component.

The inkjet ink of the present invention contains the carbon black as a pigment in an amount of 1 wt % to 20 wt %, the wetting agent in an amount of 10 wt % to 50 wt %, the surfactant in an amount of 0.01 wt % to 5 wt %, the penetrant in an amount of 0.05 wt % to 5 wt % and the resin component in an amount of 0.01 wt % to 7 wt %, to the total amount of the inkjet ink.

A wetting agent to be used in the ink has an equilibrium moisture content of 25 wt % or more measured under conditions of 20° C. and 60% relative humidity.

(Wetting Agent)

As the wetting agent, a wetting agent which tends to form hydrogen bonding, exhibits a high viscosity by itself, and has a high equilibrium moisture content but decreases in its viscosity in the presence of moisture is incorporated into the pigment dispersion liquid, thereby the inkjet ink of the present invention can be obtained.

Such a wetting agent to be used in the inkjet ink of the present invention desirably contains a polyhydric alcohol having an equilibrium moisture content of 25 wt % or more, preferably of 30 wt % or more, particularly preferably of 35 wt % or more, measured under conditions of 20° C. and 60% relative humidity, and trimethyl glycine.

In order to satisfy both the ejection stability and the image density, it is desired that the trimethylglycine content be more than 10 wt % and equal to or less than 40 wt % to the total amount of the inkjet ink. Also, it is desired that the amount of the trimethylglycine be more than 10 wt % and equal to or less than 40 wt % to the total amount of the wetting agent.

Meanwhile, as one of the polyhydric alcohols, glycerin is exemplified, and the polyhydric alcohol content is preferably 20 wt % or more, particularly preferably 25 wt % or more to 40 wt %.

Specific examples of the polyhydric alcohol for use in the wetting agent include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. In particular, glycerin rapidly increases its viscosity in accordance with the moisture evaporation, but is highly effective in suppressing aggregation of colorants to prevent particle diameters from increasing. Therefore, it is important to add glycerin in an amount of 20 wt % or more to the total amount of the wetting agent.

As a wetting agent to be used in combination with trimethyl glycine and/or glycerin, 1,3-butanediol is desirable. 1,3-Butanediol has a high equilibrium moisture content, similarly to trimethyl glycine and/or glycerin, has high reliability and is highly effective in leveling the spread of pixels when an ink is deposited on paper and further highly effective in making coloring materials stay on paper surface. Glycerin is also highly effective in improving the reliability, but if added in a large amount, the image quality degrades and the ejection stability may also degrade due to an excessively increased viscosity after moisture evaporation. For this reason, a mixture ratio of 1,3-butanediol to glycerine is 1:5 to 5:1. Further, a mixture ratio of 1,3-butanediol to trimethyl glycine and/or glycerine (1,3-butanediol: trimethyl glycine and/or glycerine) is desirably 1:1 to 4:1, more preferably 1:1 to 3:1, particularly preferably 2:1 to 3:1.

The ratio of the total amount of the ink occupied by the wetting agent to the total amount of the ink being 10 wt % to 50 wt % is in the range in which the effects of the present invention can be obtained, and more preferably in the range of 25 wt % to 35 wt %. When the amount of the wetting agent is small, the storage stability and ejection stability of the ink degrade to cause nozzle clogging easily. When the amount of the wetting agent is excessively large, the drying property of the ink degrades to cause character feathering and bleed at boundaries between different colors, resulting in a degradation in image quality.
(Surfactant)

The surfactant for use in the inkjet ink of the present invention is represented by the following Structural Formula (1).

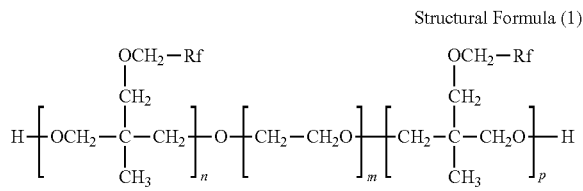

Structural Formula (1)

In Structural Formula (1), Rf denotes a fluorine-containing group; m, n, and p each represent an integer.

More specifically, Rf represents a fluorine-containing group represented by $F\text{---}(CF_2CF_2)_q$ (where, q denotes an integer of 1 to 4); and m, n and p each represent an integer of 0 to 10, provided that n and p are not zero at the same.

The addition amount of the surfactant in the ink composition is 0.01 wt % to 5.0 wt %, preferably 0.5 wt % to 3 wt %. When the addition amount is less than 0.01 wt %, the effect of adding the surfactant is hardly obtained, and when it is more than 5.0 wt %, the permeability of the ink into a recording medium is increased more than necessary, leading to a possibility of degradation in image density and occurrence of strike-through.

More preferably, the addition amount of the surfactant is equal to or more than 0.5 wt % and less than 2.5 wt %, particularly preferably equal to or more than 0.8 wt % and less than 2.0 wt %.
(Penetrant)

The penetrant desirably contains at least one polyol having solubility to 20° C. water equal to or more than 0.05 wt % and less than 5.0 wt %.

More preferably, the solubility is equal to or more than 1.0 wt % and less than 5.0 wt %, particularly preferably equal to or more than 1.0 wt % and less than 4.0 wt %.

Among such polyols, specific examples of aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol.

Among these, most desired aliphatic diols are 2-ethyl-1,3-hexanediol and/or 2,2,4-trimethyl-1,3-pentanediol.

As penetrants other than above, which may be used in combination, there are exemplified alkyl and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether, lower alcohols such as ethanol, but the penetrants are not limited thereto, as long as they are soluble in the ink and can be controlled so as to have desired physical properties.

The addition amount of the penetrant is desirably in the range of 0.05 wt % to 5.0 wt %. When the addition amount is less than 0.05 wt %, quick-drying property cannot be obtained, leading to a blurred image. In contrast, when the addition amount is more than 5.0 wt %, the dispersion stability of the colorant is impaired, causing nozzle clogging easily, and the permeability of the ink into a recording medium is increased more than necessary, leading to a possibility of degradation in image density and occurrence of strike-through.

More preferably, the addition amount of the penetrant is 0.5 wt % to 4.0 wt %, particularly preferably 1.0 wt % to 3.0 wt %.
(Resin Component)

As the resin component for use in the inkjet ink of the present invention, a polymer emulsion such as aqueous emulsion is added to the pigment dispersion liquid. As such a resin component, the resin used in the polymer emulsion is preferably polyurethane resin from the viewpoint of fixation and dispersion stability of the pigment, and as the resin, an ether-based resin is more preferable to polyether-based resins and polycarbonate-based resins.

In the inkjet ink of the present invention, the polyurethane emulsion used as the resin component preferably has an average particle diameter of 50 nm or less because the dispersibility is stabilized.

The addition amount of the polyurethane emulsion used as the resin component is preferably 0.01 wt % to 7 wt % based on the polyurethane solid content. When the addition amount is less than 0.01 wt %, pigment particles therein adsorb to each other due to the small amount of polyurethane components adsorbing to the pigment particles, leading to a possibility of an increase in viscosity of the dispersion liquid. When the addition amount of the polyurethane emulsion is more than 7 wt %, the pigment dispersion liquid could be unstable due to adhesion between the polyurethane components.

With use of such a polyurethane emulsion containing polymer fine particles in combination with the carbon black as a coloring material, the average particle diameter D50 of the carbon black can be more than 5 µm and D90 of the carbon black can be more than 10 µm at the time of the solvent residual rate being 60%. In addition, it is possible to prevent the pigment from being detached from the surface of a recording medium, to moderately suppress the permeability of the ink into the recording medium, and to increase the image density.

The emulsion is classified into two types, i.e., an emulsion which is obtained by emulsification of a common polyurethane resin, which is relatively hydrophilic, using an emulsifier externally; and a self-emulsifying emulsion in which a functional group serving as an emulsifier is introduced into a resin by copolymerization or the like. In various combinations with pigment and dispersant, it is preferred to use an anionic self-emulsifying polyurethane-based resin emulsion which is excellent in dispersion stability at all times.

In the preparation of the pigment dispersion liquid, as the polyurethane resin, an ether-based polyurethane resin is preferable to polyether-based and polycarbonate-based polyurethane resins from the viewpoint of fixation and dispersion stability of the pigment. If the self-emulsifying polyurethane is not anionic, the pigment dispersion liquid could be unstable.

In addition, for example, an antifoaming agent, an antiseptic/antibacterial agent, a corrosion inhibitor, a pH adjuster, a specific resistance adjuster, an antioxidant, an ultraviolet absorber, an oxygen absorbent, a light stabilizer, a viscosity adjuster and the like can be incorporated into the inkjet ink.

The method for producing the inkjet ink is not particularly limited, and the inkjet ink can be produced by any known method. For example, the pigment dispersion liquid of the present invention, water, an aqueous organic solvent, a surfactant and the like are stirred and mixed to prepare a mixture, coarse particles in the mixture are filtered out using a filter, a centrifugal separator or the like, and the resulting mixture is deaerated as required to thereby obtain an inkjet ink. Note that water used in the inkjet ink, similar water to that used in the pigment dispersion liquid is used.

<Ink Cartridge>

The inkjet ink thus obtained can be suitably housed in an ink cartridge. Also, the inkjet ink of the present invention can be ejected on a recording medium such as paper to form an image by an image recording apparatus which performs recording (printing) to form an image, for example, an inkjet printer.

Examples of image printing methods include continuous ejection printing systems and on-demand printing systems. Examples of the on-demand printing systems include, but are not limited to, piezo printing system, thermal printing system, and electrostatic printing system.

In the present invention, as the recording medium, there may be exemplified an inkjet recording medium which has a texture of a coat paper for offset printing, which includes a raw paper mainly composed of a wood pulp and an ink receiving layer containing kaolin and a binder on one surface or on both surfaces of the raw paper, and which has a white paper glossiness of less than 80% at a light-incident angle of 75 degrees measured by JIS Z8741. The following describes the recording medium.

<Recording Medium>

A recording medium for use in the present invention includes a raw paper mainly composed of a wood pulp and an ink receiving layer containing kaolin and a binder on one surface or on both surfaces of the raw paper, and has a white paper glossiness of less than 80% at a light-incident angle of 75 degrees measured by JIS Z8741.

(Raw Paper)

A raw paper for use in the recording medium of the present invention is mainly composed of a wood pulp. As the raw material pulp, there are exemplified chemical pulps (bleached or unbleached softwood Kraft pulp, bleached or unbleached hardwood Kraft pulp, etc.), mechanical pulps (ground pulp, thermomechanical pulp, chemical thermomechanical pulp, etc.), and deinking pulp. These pulps may be used alone or may be used in combination at a predetermined proportion.

The paper machine pH of the raw paper may be acidic, neutral, or alkaline. Also, known fillers such as silica hydrate, white carbon, talc, kaolin, clay, calcium carbonate, titanium oxide and synthetic resin filler can be used in the raw paper. Further, into the raw paper for use in the present invention, auxiliary agents such as an aluminum sulfate, a sizing agent, a paper strength additive, a retention aid, colorants, dyes, an antifoaming agent and a pH adjuster may be incorporated as necessary. Note that the basis weight of the raw paper is not particularly limited.

In the present invention, for the purpose of imparting the paper strength and sizing property to the recording medium, the raw paper may be impregnated or coated with a size press liquid, which is prepared from a starch, PVA, a sizing agent and the like, before the ink receiving layer is provided to the raw paper.

The method of performing the impregnation or coating is not particularly limited. It is, however, preferable that the raw paper be impregnated or coated with the size press liquid by an impregnation method typified by pond type size press and rod metaling size press or a coating method typified by gate roll coater, and blade coater. Further, in the impregnation or coating the raw paper with the size press liquid, auxiliary agents such as a fluorescent dye, a conductivity imparting agent, a water retention agent, a water resistant additive, a pH adjuster, an antifoaming agent, a lubricant, an antiseptic agent and a surfactant may be mixed in the size press liquid as necessary, within the range not impairing the effects of the present invention.

(Ink Receiving Layer of Recording Medium)

1. Pigment for Ink Receiving Layer

The recording medium of the present invention has an ink receiving layer on one surface or both surfaces thereof. The pigment used for forming the ink receiving layer is mainly composed of kaolin. Kaolin is made of clay containing at least one or more of kaolin minerals such as kaolinite, halloysite, dickite, and nacrite. Known kaolins for use in typical coat papers for offset printing can be used without particular limitation. As the kaolin, for example, those made in Georgia, Brazil, China and the like are available, and kaolins are graded into primary kaolin, secondary kaolin, delami kaolin, etc. These kaolins may be used alone or two or more kaolins may be selected therefrom in the form of a mixture.

The kaolin content is preferably 60 parts by weight or more per 100 parts by weight of all the inorganic pigments contained in the ink receiving layer. When the kaolin content is less than 60 parts by weight, the glossiness arising from kaolin is hardly effected on the ink receiving layer, and the wettability to an aqueous ink and the texture of coat paper are lost, resulting in difficulty in obtaining the texture of offset printed matter. The kaolin content is preferably 70 parts by weight or more, most preferably 100 parts by weight (the inorganic pigment is composed of 100% kaolin).

Inorganic pigments other than kaolin for use in forming the ink receiving layer may be used without particular limitation, as long as they are known pigments for use in typical coat papers for offset printing. As the inorganic pigments, one or more inorganic pigments may be suitably selected and used from among, for example, calcium carbonate heavy, precipitated calcium carbonate light, silica calcium carbonate composite pigments, talc, fired kaolins obtained by firing the above kaolins, calcium sulfate, barium sulfate, titanium dioxide, zinc oxide, alumina, magnesium carbonate, silica, calcium silicate, bentonite, zeolite, sericite, and smectite.

2. Binder for Ink Receiving Layer

As a binder used for forming the ink receiving layer, known binders for use in typical coat papers for offset printing can be used without particular limitation. As the binder, one or more binders may be suitably selected and used from among, for example, starches such as etherificated starch powder, and esterified starch powder; latexes such as SB latex and NB latex; polyvinyl alcohols and modified products thereof, casein, gelatin, carboxymethylcellulose, polyurethane; and binders such as vinyl acetate and unsaturated polyester resin. However, in light of the flowability and coating applicability of the coating liquid prepared, it is preferable to use latexes and/or starches or a mixture thereof.

The binder content is preferably equal to or more than 5 parts by weight and less than 15 parts by weight per 100 parts by weight of all the inorganic pigments contained in the ink receiving layer. When the binder content is less than 5 parts by weight, the strength of the ink receiving layer is insufficient. In contrast, when the binder content is more than 15 parts by weight, voids present in the ink receiving layer are filled with the binder, the ink-absorbing capacity decreases, and thus it is difficult to obtain excellent print quality in the case of using an ink having high concentration/high viscosity.

(Other Components)

In the ink receiving layer, other auxiliary agents such as organic pigments (e.g., plastic pigment), a pigment dispersant, a thickening agent, a water retention agent, a lubricant, an antifoaming agent, a foam inhibitor, a releasing agent, a foaming agent, a color dye, a color pigment, a fluorescent dye, an antiseptic agent, a water resistance agent, a surfactant, and a pH adjuster may be suitably added as necessary.

Note that the organic pigment content is preferably 20 parts by weight or less per 100 parts by weight of all the inorganic pigments contained in the ink receiving layer.

(Coated Amount)

The coated amount (basis weight) of the ink receiving layer is not particularly limited. It is, however, preferably equal to or more than 2 g/m$^2$ and less than 40 g/m$^2$, particularly preferably equal to or more than 5 g/m$^2$ and less than 30 g/m$^2$. When the coated amount of the ink receiving layer is less than 2 g/m$^2$, a raw paper serving as a base cannot be covered with the ink receiving layer, and thus the resulting coat paper has a rough surface and a texture like a non-coat paper, resulting in difficulty in obtaining an ink printed matter having an intended texture of offset printed matter. In addition, printing defects such as feathering and bleed tend to occur due to insufficient ink-absorbing capacity of the ink receiving layer. In contrast, when the coated amount of the ink receiving layer is more than 40 g/m$^2$, the workability degrades due to too large drying load, resulting in high production costs.

(Coating Method)

As a method of providing an ink receiving layer on the raw paper, a variety of typical coaters such as a blade coater, roll coater, air knife coater, bar coater, gate roll coater, curtain coater, gravure coater, flexo gravure coater, spray coater, and size press can be used on-machine or off-machine. As the ink receiving layer, one layer or two or more layers may be formed. Further, after an ink receiving layer is formed, the layer can also be subjected to surface treatment using a calender such as a machine calender, super calender, soft calender, and shoe calender.

(White Paper Glossiness)

The surface of the ink receiving layer in the inkjet recording medium is required to have a white paper glossiness of less than 80% at a light-incident angle of 75 degrees measured by JIS Z8741. Since an ink receiving layer having a white paper glossiness more than 80% is subjected to a significantly strong calendering treatment, voids present in the ink receiving layer are reduced, and thus excellent ink-absorbing property cannot be obtained. When the glossiness of the ink receiving layer is excessively low, the recording medium may be impaired in terms of the texture of offset printed matter. Therefore, the white paper glossiness is preferably 15% or more, more preferably equal to or more than 15% and less than 75%.

(Image Forming Apparatus and Recording Method)

An image forming apparatus of the present invention includes at least an ejection unit configured to eject the inkjet ink of the present invention so as to form an image and further includes other units as required.

A recording method of the present invention includes at least ejecting the inkjet ink of the present invention so as to form an image and further includes other steps as required.

Examples of the printing (ejection) method include continuous ejection printing systems and on-demand printing systems. Examples of the on-demand printing systems include, but are not limited to, piezo printing system, thermal printing system, and electrostatic printing system.

In the piezo printing system, a piezoelectric element is used as a pressure generating unit which is configured to pressurize an ink in an ink flow passage so as to deform a vibration plate forming a wall surface of the ink flow passage and to change the internal capacity of the ink flow passage, thereby ejecting ink droplets (see Japanese Patent Application Laid-Open (JP-A) No. 02-51734).

In the thermal printing system, an exothermic resistance element is used to heat an ink inside an ink flow passage and to generate air bubbles, thereby ejecting ink droplets (see Japanese Patent Application Laid-Open (JP-A) No. 61-59911).

In the electrostatic printing system, a vibration plate and an electrode forming a wall surface of an ink flow passage are provided so as to face to each other, and an electrostatic force is generated between the vibration plate and the electrode so as to deform the vibration plate, thereby ejecting ink droplets (see Japanese Patent Application Laid-Open (JP-A) No. 06-71882).

Figure 1:
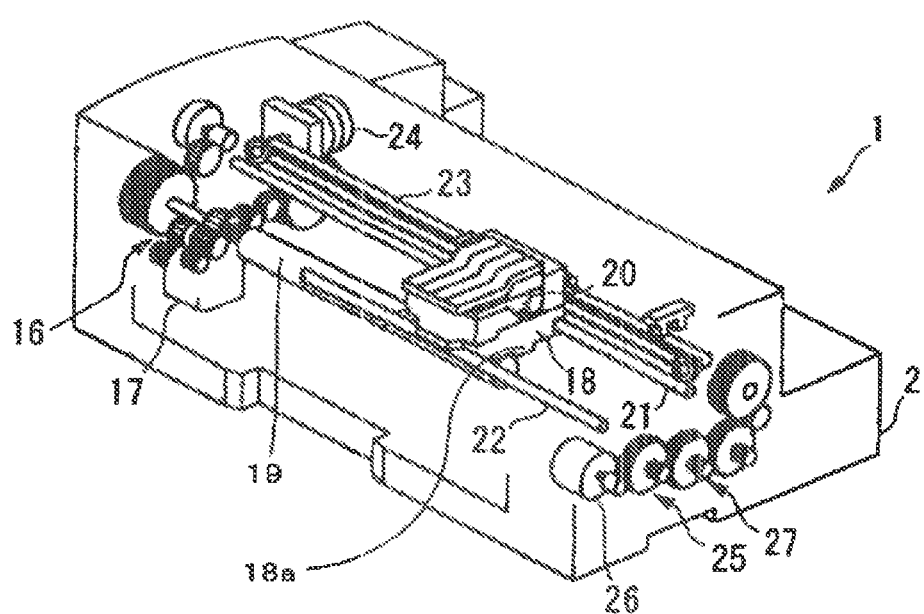
FIG. 1 is a diagram illustrating an inkjet recording device housing an inkjet ink according to the present invention.

In FIG. 1, an ink cartridge 20, in which the inkjet ink of the present invention is to be housed, is stored in a carriage 18. In FIG. 1, the ink cartridge 20 is provided in plural number, but there is no need to provide a plurality of the ink cartridges 20. In this state, the inkjet ink is supplied from the ink cartridge 20 to a liquid droplet ejection head 18a which is mounted on the carriage 18. Note that in FIG. 1, an ejection nozzle surface faces downward, and thus it is invisible to observer, and the inkjet ink is ejected from the liquid droplet ejection head 18a.

The liquid droplet ejection head 18a mounted on the carriage 18 moves by a timing belt 23 which is driven by a main scanning motor 24, while being guided by guide shafts 21 and 22. Meanwhile, a specific coat paper (image support) is placed, by a platen 19, at a position facing to the liquid droplet ejection head 18a. Note that in FIG. 1, an inkjet recording apparatus 1 includes a main body housing 2, a gear mechanism 16, a sub-scanning motor 17, gear mechanisms 25 and 27, and a main scanning motor 26. In the above recording method, an image is recorded on a recording medium using an image recording apparatus in which the inkjet ink of the present invention is housed, and the glossiness of an image part of the recorded image is 90% of the glossiness of a non-image part of the recording medium.

(Image Formed Matter)

An image formed matter of the present invention includes an image which is formed on a recording medium using the inkjet ink of the present invention When an image is formed on a recording medium using an inkjet recording apparatus in which the inkjet ink of the present invention is houses, an image formed matter in which an image printed on-demand on the recording medium can be obtained. Replenishing of the inkjet ink can be performed by replacing the ink cartridge.

EXAMPLES

Hereinafter, the present invention will be further described in detail with reference to Examples and Comparative Examples, however, the present invention shall not be construed as being limited to these disclosed Examples. It should be noted that in the following examples, the numbers represented by "part(s)" or "%" are on a weight basis, i.e., "part(s) by weight" or "wt % (weight %)) except for those of "glossiness ratio" and "rate of change in glossiness".

1. Production of Raw Paper

A bleached hardwood Kraft pulp (water filtration degree: 480 mL) and a bleached softwood Kraft pulp (water filtration degree: 500 mL) were mixed at a mixture ratio of 70%:30%. Then, a cationized starch in an amount of 0.5% with respect to the pulp, an alkyl ketene dimer in an amount of 0.05% with respect to the pulp, an aluminum sulfate in an amount of 2% with respect to the pulp, and a calcium carbonate in an amount of 10% with respect to the pulp were added into the pulp to prepare a paper slurry. The paper slurry was subjected to paper machining through a Fourdrinier paper machine to form a web, and then the web was subjected to three-step-wet pressing process, drying, and machine calendering, whereby a raw paper having a basis weight of 80 g/m² was obtained.

2. Preparation of Recording Medium (Sample 1)

Kaolin (70 parts) (DB-KOTE: produced by IMERYS), silica (30 parts), SB latex (8 parts) (glass transition temperature: 15° C.) serving as a binder, a starch oxide (1 part) (MERMAID 210: produced by Shikishima Starch Co., Ltd.) serving as a binder, sodium hydroxide (0.1 parts), polyacrylic acid soda (0.2 parts) as a dispersant and dilution water were mixed to obtain a coating liquid having a solid content of 65%. The coating liquid was applied on a surface of the raw paper using a blade coater so that the coated amount was 12 g/m². After coating, the raw paper was dried until the rate of moisture in the paper became 5%. Then, the dried raw paper was subjected to super-calendering so that the white paper glossiness at a light-incident angle of 75 degrees measured according to JIS Z8741 was 70%, thereby obtaining an inkjet recording medium.

(Sample 2)

A recording medium of Sample 2 was produced in the same manner as in Sample 1, except that the amounts of kaolin (70 parts) and silica (30 parts) were changed to kaolin (100 parts).

3. Preparation of Dispersion Liquid

Dispersion Liquid (A):

A gas black carbon (200 g) having a BET specific surface area of 110 m²/g and an average particle diameter of 25 nm; a sodium naphthalenesulfonate-formalin condensate (10 g) as a dispersant (A-45-PN, produced by Takemoto Oil & Fat Co., Ltd.)(total amount of a dimer, a trimer and a tetramer of naphthalene sulfonic acid: 48%); and distilled water (790 g) were premixed. After the premixing, the premixture was dispersed using a bead mill dispersing device (UAM-015, manufactured by Kotobuki Kogyo Co., Ltd.) with a zirconia bead of 0.03 mm in diameter (density: $6.03 \times 10^{-5}$ g/m²) under the conditions: a circumferential speed of 10 m/s; a liquid temperature of 32° C. for 10 minutes. Thereafter, the mixture dispersion was subjected to centrifugal separation by a centrifugal separator (Model-3600, Kubota Corporation) so as to filter out coarse particles, followed by filtration with a membrane filter of 0.5 µm in average pore size, whereby obtaining Dispersion Liquid (A).

Dispersion Liquid (B):

Dispersion Liquid (B) was obtained in the same manner as in preparation of Dispersion Liquid (A), except that instead of the gas black carbon in Dispersion Liquid (A), a gas black carbon having a BET specific surface area of 260 m²/g and an average primary particle diameter of 15 nm was used, the amount of the dispersant was changed to 12 g, and the amount of the distilled water was changed to 788 g.

Dispersion Liquid (C):

Dispersion Liquid (C) was obtained in the same manner as in preparation of Dispersion Liquid (A), except that instead of the gas black carbon in Dispersion Liquid (A), a gas black carbon having a BET specific surface area of 320 m²/g and an average primary particle diameter of 13 nm was used, the amount of the dispersant was changed to 15 g, and the amount of the distilled water was changed to 785 g.

Dispersion Liquid (D):

Dispersion Liquid (D) was obtained in the same manner as in preparation of Dispersion Liquid (A), except that the amount of the dispersant was changed to 20 g.

Dispersion Liquid (E):

Dispersion Liquid (E) was obtained in the same manner as in preparation of Dispersion Liquid (A), except that the amount of the dispersant was changed to 80 g.

Dispersion Liquid (F):

Dispersion Liquid (F) was obtained in the same manner as in preparation of Dispersion Liquid (A), except that the amount of the dispersant was changed to 50 g and the amount of the distilled water was changed to 750 g.

Dispersion Liquid (G):

Dispersion Liquid (G) was obtained in the same manner as in preparation of Dispersion Liquid (A), except that the amount of the dispersant was changed to 150 g and the amount of the distilled water was changed to 650 g.

Dispersion Liquid (H):

Dispersion Liquid (H) was obtained in the same manner as in preparation of Dispersion Liquid (A), except that instead of the gas black carbon in Dispersion Liquid (A), a gas black carbon having a BET specific surface area of 460 m²/g and an average primary particle diameter of 13 nm was used.

Dispersion Liquid (I):

Dispersion Liquid (I) was obtained in the same manner as in preparation of Dispersion Liquid (A), except that instead of the gas black carbon in Dispersion Liquid (A), a gas black carbon having a BET specific surface area of 90 m²/g and an average primary particle diameter of 29 nm was used.

Dispersion Liquid (J): (Surface Treated Carbon Black Pigment Dispersion Liquid)

A furnace carbon (90 g) having a BET specific surface area of 220 m²/g and an average primary particle diameter of 17 nm was added to a 2.5-N sodium sulfate solution (3,000 mL), stirred at 60° C. and 300 rpm for a reaction of oxidation treatment for 10 hours. The reaction liquid was filtered, and the carbon black that had been filtered out was neutralized with a sodium hydroxide, followed by ultrafiltration. The resultant carbon black was washed with water, dried, and then dispersed in pure water so that the amount of the carbon black was 20 wt %, thereby obtaining Dispersion Liquid (J).

Dispersion Liquid (K):

A furnace carbon (200 g) having a BET specific surface area of 220 m²/g and an average particle diameter of 17 nm; polyvinyl pyrrolidone (2 g) (average molecular weight: 25,000) as a dispersant; and distilled water (798 g) were premixed. After the prem-ixing, the premixture was dispersed using a bead mill dispersing device (UAM-015, manufactured by Kotobuki Kogyo Co., Ltd.) with a zirconia bead of 0.03 mm in diameter (density: $6.03 \times 10^{-6}$ g/m²) under the conditions: a circumferential speed of 10 m/s; a liquid temperature of 32° C. for 10 minutes. Thereafter, the mixture dispersion was filtered through a membrane filter of 5 µm in average pore size, whereby obtaining Dispersion Liquid (K).

Dispersion Liquid (L):

Dispersion Liquid (L) was obtained in the same manner as in preparation of Dispersion Liquid (K), except that the dispersant was changed to PLYSURF A-219B (produced by DAI-ICHI KOGYO SEIYAKU CO., LTD.: polyoxyethylene alkyl ether phosphate).

Dispersion Liquid (M):

Dispersion Liquid (M) was obtained in the same manner as in preparation of Dispersion Liquid (K), except that the dispersant was changed to HITENOL 18E (produced by DAI-ICHI KOGYO SEIYAKU CO., LTD., anionic surfactant).

Dispersion Liquid (N):

Dispersion Liquid (N) was obtained in the same manner as in preparation of Dispersion Liquid (K), except that the furnace carbon was changed to a furnace carbon having a BET specific surface area of 250 m²/g and an average primary particle diameter of 15 nm, and the dispersant was changed to HITENOL 18E.

Dispersion Liquid (O):

Dispersion Liquid (O) was obtained in the same manner as in preparation of Dispersion Liquid (N), except that the furnace carbon was changed to a furnace carbon having a BET specific surface area of 90 m$^2$/g and an average primary particle diameter of 26 nm.

Dispersion Liquid (P):

Dispersion Liquid (P) was obtained in the same manner as in preparation of Dispersion Liquid (A), except that the centrifugal separation conditions were adjusted so that the dispersion time for dispersing the dispersion liquid was 8 minutes.

Dispersion Liquid (Q):

Dispersion Liquid (Q) was obtained in the same manner as in preparation of Dispersion Liquid (A), except that the dispersant was changed to HITENOL 18E (produced by DAIICHI KOGYO SEIYAKU CO., LTD., anionic surfactant), and the dispersion time was changed to 18 minutes.

Dispersion Liquid (R):

Dispersion Liquid (R) was obtained in the same manner as in preparation of Dispersion Liquid (A), except that the total amount of a dimer, a trimer and a tetramer of a naphthalenesulfonic acid contained in the sodium naphthalenesulfonate-formalin condensate was changed to 15%. Note that the total amount of a dimer, a trimer and a tetramer of a naphthalenesulfonic acid contained in the sodium naphthalenesulfonate-formalin condensate was determined by molecular weight measurement through GPC (liquid chromatograph).

Hereinbelow, the present invention will be further described with reference to Examples of the present invention and Comparative Examples, however, the following Examples shall not be construed as limiting the present invention.

An ink composition having the following formulation was prepared, and the ink composition was adjusted with a 10% lithium hydroxide solution to have a pH of 9. Thereafter, the ink composition was filtered through a membrane filter of 0.5 μm in average pore size to thereby obtain an ink composition.

Example 1

| | |
|---|---|
| Dispersion Liquid (A) | 10.0% |
| | (as solid content) |
| 3-methyl-1,3-butanediol | 20.0% |
| trimethylglycine | 8.0% |
| surfactant represented by Structural Formula (2) described below: PF-151N (fluorochemical surfactant produced by OMNOVA Solutions Inc.) | 0.5% |
| 2-ethyl-1,3-hexanediol | 2.0% |
| TAKELAC W5025 | 3.0% |
| (water-soluble polyurethane, produced by Mitsui Chemicals Polyurethane Inc.) | (as solid content) |
| ion exchanged water as the rest | |

Note that the description "Dispersion Liquid (A) 10.0% (as solid content)" means that the solid content (pigment solids) contained in Dispersion Liquid (A) is 10 when the amount of the ink composition is regarded as 100; and the description "TAKELAC W5025, 3.0% (as solid content)" means that the solid content contained in TAKELAC W5025 is 3 when the amount of the ink composition is regarded as 100.

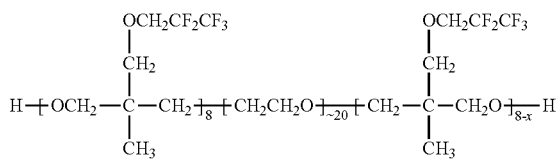

Structural Formula (2)

In Structural Formula (2), "−20" represents an integer of 20 or less; and X is an integer of zero to 8.

Example 2

| | |
|---|---|
| Dispersion Liquid (A) | 10.0% |
| | (as solid content) |
| 1,6-hexanediol | 17.0% |
| trimethylglycine | 10.0% |
| surfactant represented by Structural Formula (2) described above: PF-151N (fluorochemical surfactant produced by OMNOVA Solutions Inc.) | 0.5% |
| 2-ethyl-1,3-hexanediol | 2.0% |
| TAKELAC W5052 | 3.0% |
| (water-soluble polyurethane, produced by Mitsui Chemicals Polyurethane Inc.) | (as solid content) |
| ion exchanged water as the rest | |

Example 3

| | |
|---|---|
| Dispersion Liquid (A) | 10.0% |
| | (as solid content) |
| 1,5-pentanediol | 15.0% |
| trimethylglycine | 12.0% |
| surfactant represented by Structural Formula (2) described above: PF-151N (fluorochemical surfactant produced by OMNOVA Solutions Inc.) | 0.5% |
| 2-ethyl-1,3-hexanediol | 2% |
| TAKELAC W5052 | 3.0% |
| (water-soluble polyurethane, produced by Mitsui Chemicals Polyurethane Inc.) | (as solid content) |
| ion exchanged water as the rest | |

Example 4

| | |
|---|---|
| Dispersion Liquid (A) | 10.0% |
| | (as solid content) |
| 1,3-butanediol | 15.0% |
| trimethylglycine | 15.0% |
| surfactant represented by Structural Formula (2) described above: PF-151N (fluorochemical surfactant produced by OMNOVA Solutions Inc.) | 0.5% |
| 2-ethyl-1,3-hexanediol | 2% |
| TAKELAC W5025 | 3.0% |
| (water-soluble polyurethane, produced by Mitsui Chemicals Polyurethane Inc.) | (as solid content) |
| ion exchanged water as the rest | |

Example 5

| | |
|---|---|
| Dispersion Liquid B | 10.0% |
| | (as solid content) |
| 3-methyl-1,3-butanediol | 20.0% |
| trimethylglycine | 8.0% |
| surfactant represented by Structural Formula (2) described above: PF-151N (fluorochemical surfactant produced by OMNOVA Solutions Inc.) | 0.5% |
| 2-ethyl-1,3-hexanediol | 2.0% |
| TAKELAC W5025 | 3.0% |
| (water-soluble polyurethane, produced by Mitsui Chemicals Polyurethane Inc.) | (as solid content) |
| ion exchanged water as the rest | |

Examples 6 to 12

Ink liquids of Examples 6 to 12 were obtained in the same manner as in Example 1, except that Dispersion Liquid (A) used in Example 1 was changed to each of the Dispersion Liquids (C) to (I) in this order.

Examples 13 to 15

Ink liquids of Examples 13 to 15 were obtained in the same manner as in Example 1, except that Dispersion Liquid (A) used in Example 1 was changed to each of the Dispersion Liquids (P) to (R) in this order.

Comparative Example 1

| | |
|---|---|
| Dispersion Liquid J | 10.0% |
| | (as solid content) |
| 3-methyl-1,3-butanediol | 20.0% |
| glycerin | 8.0% |
| SURFYNOL 456 | 0.5% |
| (acetylene-based surfactant, produced by Air Products and Chemicals Inc.) | |
| 2-ethyl-1,3-hexanediol | 2.0% |
| TAKELAC W5052 | 3.0% |
| (water-soluble polyurethane, produced by Mitsui Chemicals Polyurethane Inc.) | (as solid content) |
| ion exchanged water as the rest | |

Comparative Examples 2 to 6

Ink liquids of Comparative Examples 2 to 6 were obtained in the same manner as in Comparative Example 1, except that Dispersion Liquid (J) used in Comparative Example 1 was changed to each of the Dispersion Liquids (K) to (O) in this order.

Evaluation of Print Quality

Printing was performed on each of the recording medium samples 1 and 2, using a drop-on-demand printer (test production printer) having 384 nozzles with a 300 dpi resolution, at an image resolution of 600 dpi. The amount of ink adhesion was adjusted so that the maximum droplet size was 18 pl (pico-litters) and the total amount of a secondary color ink was 140%. A solid image and a character image were printed. When the solid image was printed, the total amount of ink in 300 dot square was adjusted so as not to be higher than 15 $g/m^2$. The resultant images were evaluated as to image quality and image reliability. The evaluation results are shown in Table 1. In the evaluation results, those graded "D" or "C" are not suitable as an inkjet image.

1. Evaluation of Number of Coarse Particles (the Number of Fine Particles of 0.5 μm or Greater: [Number of Particles/5 μl])

In measurement of coarse particles, ACCUSIZER 708A manufactured by Particle Sizing. Systems, Inc. was used.
Condition: measurement liquid: 0.08% aqueous solution
Conditions of measurement system:
Data Collection Time: 60 sec
Number Channels: 128
Diluent Flow Rate: 60 mL/min
Target Concentration: 4000 parts/mL
Number of Samples: 3
Time Between samples: 1 min
Background Threshold: 10 parts/sec 2. Measurement of Particle Diameter In measurement of particle diameters, MICROTRACK UPA150 was used and a volume average particle diameter of the ink liquids was measured (median diameter: D50, unit: [nm]).
Condition: measurement liquid: 0.1% aqueous solution
Conditions of measurement system:
Part Refractive Index: 1.86
Part Density: 1.86 ($gm/cm^3$)
Fluid Refractive Index: 1.33

3. Evaluation of Glossiness Ratio

In measurement of glossiness, GLOSSMETER VG2000 was used. Specifically, the glossiness of an image part and a non-image part of the image formed matters printed using the recording media (above-mentioned Samples 1 and 2) was measured at a light-incident angle of 75 degrees.

A glossiness ratio was determined using the following equation.

$$\text{Glossiness Ratio (\%)} = (\text{Glossiness at an image part}/\text{Glossiness at a non-image part}) \times 100$$

[Evaluation Criteria]
Glossiness Ratio (%)
A: 90% to 100%
B: 70% to 89%
C: 69% or less 4. Evaluation of Image Density The optical density of black-solid image parts formed using the ink liquids of Examples and Comparative Examples was measured by a spectrocolorimeter (X-Rite 938), and the image parts were evaluated based on the following criteria.
[Evaluation Criteria]
Image Density
A: 1.6 or higher
B: 1.3 or higher
C: 1.0 or higher
D: lower than 1.0

5. Evaluation of Ejection Stability

The ejection stability was evaluated according to the following procedure.
After a printed matter was printed, the printer was left unused at 40° C. for one month with the print head being capped. Whether the ejection state of the printer after being left unused recovers from the initial ejection state was determined depending on the number of cleaning operations.
A: recovered by one time of cleaning operation
B: recovered by two times of cleaning operation
C: recovered by three times of cleaning operation
D: not recovered even by four times of cleaning operation 6. Evaluation of Storage Stability of Ink Liquid Each of the inks was poured into a polyethylene bottle. The bottle was tightly sealed and then stored at 70° C. for three weeks. Thereafter, the particle diameter, surface tension and viscosity of each of the inks were measured. The rate of change in these physical property items between the initial value and the test result was determined, and the results were evaluated as follows.

A: In all the physical property items of particle diameter, surface tension and viscosity, the rate of change was less than 5%.

B: In all the physical property items of particle diameter, surface tension and viscosity, the rate of change was less than 10%.

C: In all the physical property items of particle diameter, surface tension and viscosity, the rate of change was less than 30%.

D: In at least one physical property item of particle diameter, surface tension and viscosity, the rate of change was 30% or more.

For the inks except for those of Examples 3 and 4, Sample 1 (glossiness: 55%) was used as a recording medium. For the inks of Examples 3 and 4, Sample 2 (glossiness: 70%) was used. Each of the inks of Examples and Comparative Examples were evaluated based on the above evaluation criteria 1 to 6. The evaluation results are collectively shown in Tables 1 and 2.

18a liquid droplet ejection head
19 platen
20 ink cartridge
21 guide shaft
22 guide shaft
23 timing belt
24 main scanning motor
25 gear mechanism
26 main scanning motor
27 gear mechanism

The invention claimed is:

1. An inkjet ink, comprising:
a carbon black,
a dispersant,
water,
a wetting agent, wherein the wetting agent comprises trimethylglycine in an amount of more than 10 wt % and equal to or less than 40 wt % of the total amount of the wetting agent,
a surfactant,
a penetrant, and
a resin component,

TABLE 1

|  | Dispersion Liquid | Number of coarse particles of 0.5 μm or greater in diameter | Ink D50 (nm) | Standard deviation of ink particle diameter (nm) | Ratio of Glossiness | Image density | Ejection stability | Storage stability of ink liquid |
|---|---|---|---|---|---|---|---|---|
| Ex. 1 | A | 750,000 | 105.3 | 47.5 | A | A | A | A |
| Ex. 2 | A | 750,000 | 115.4 | 51.0 | A | A | A | A |
| Ex. 3 | A | 740,000 | 107.3 | 50.2 | A | A | A | A |
| Ex. 4 | A | 760,000 | 110.5 | 49.2 | A | A | A | A |
| Ex. 5 | B | 820,000 | 112.9 | 49.7 | A | A | A | A |
| Ex. 6 | C | 950,000 | 106.1 | 48.3 | A | A | A | A |
| Ex. 7 | D | 750,000 | 110.2 | 49.2 | A | A | A | A |
| Ex. 8 | E | 740,000 | 112.1 | 49.3 | A | A | A | A |
| Ex. 9 | F | 750,000 | 110.3 | 48.1 | A | A | A | A |
| Ex. 10 | G | 740,000 | 117.0 | 49.2 | A | A | A | A |
| Ex. 11 | H | 980,000 | 117.2 | 48.3 | A | B | B | B |
| Ex. 12 | I | 810,000 | 110.4 | 41.1 | A | B | B | B |
| Comp. Ex. 1 | J | 1,200,000 | 65.9 | 35.2 | C | C | C | D |
| Comp. Ex. 2 | K | 2,500,000 | 134.8 | 78.3 | C | D | D | D |
| Comp. Ex. 3 | L | 5,080,000 | 156.3 | 84.2 | C | D | D | D |
| Comp. Ex. 4 | M | 7,490,000 | 184.2 | 99.3 | C | D | D | D |
| Comp. Ex. 5 | N | 11,070,000 | 202.8 | 160.2 | C | D | D | D |
| Comp. Ex. 6 | O | 9,250,000 | 191.4 | 102.1 | B | D | D | D |

TABLE 2

|  | Dispersion Liquid | Number of coarse particles of 0.5 μm or greater in diameter | Ink D50 (nm) | Standard deviation of ink particle diameter (nm) | Ratio of Glossiness | Image density | Ejection stability | Storage stability of ink liquid |
|---|---|---|---|---|---|---|---|---|
| Ex. 13 | P | 860,000 | 124 | 73 | A | B | C | C |
| Ex. 14 | Q | 920,000 | 134 | 61 | A | B | C | C |
| Ex. 15 | R | 1,150,000 | 124 | 59 | B | C | C | C |

REFERENCE SIGNS LIST 1 inkjet recording apparatus
2 main body housing
16 gear mechanism
17 sub-scanning motor
18 carriage wherein a total number of coarse particles having a particle diameter of 0.5 μm or greater contained in the inkjet ink is 1,000,000/5 μL or less, and
wherein the inkjet ink comprises the carbon black in an amount of from 1 wt % to 20 wt %, the wetting agent in an amount of from 10 wt % to 50 wt %, the surfactant in an amount of from 0.01 wt % to 5 wt %, the penetrant in an amount of from 0.05 wt % to 5 wt % and the resin component in an amount of from 0.01 wt % to 7 wt %.

2. The inkjet ink of claim 1, wherein the wetting agent comprises a polyhydric alcohol and trimethylglycine,
wherein the polyhydric alcohol has an equilibrium moisture content of 25 wt % or more measured under conditions of 20° C. and 60% relative humidity.

3. The inkjet ink of claim 2, wherein a trimethylglycine content is more than 10 wt % and equal to or less than 40 wt % to the total amount of the inkjet ink.

4. The inkjet ink of claim 1, wherein the surfactant comprises a compound of Formula (1):

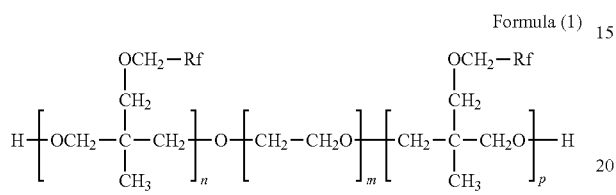

Formula (1)

wherein Rf is a fluorine-containing group; m, n, and p are each independently an integer, with the proviso that n and p are not zero at the same time.

5. A recording method comprising:
applying an ink to a surface of a recording medium according to recording information employing an image forming apparatus in which one selected from the group consisting of an inkjet ink and an ink cartridge housing an inkjet ink therein is installed, to thereby perform recording,
wherein the recording medium has a white paper glossiness of less than 80% at a light-incident angle of 75 degrees measured by JIS Z8741, and when recorded, a glossiness of an image part of the recording medium is 90% of a glossiness of a non-image part thereof,
wherein the inkjet ink is an inkjet ink according to claim 1.

6. The recording method of claim 5, wherein the recording medium comprises:
a raw paper comprising a wood pulp, and
an ink receiving layer on one surface or on both surfaces of the raw paper, the ink receiving layer comprising kaolin and a binder
wherein the recording medium has a white paper glossiness of less than 80% at a light-incident angle of 75 degrees measured by JIS Z8741.

* * * * *